United States Patent [19]
Wood

[11] Patent Number: 5,640,820
[45] Date of Patent: Jun. 24, 1997

[54] REPAIR OF DRYWALL SURROUNDING ELECTRICAL BOXES

[76] Inventor: Ronald L. Wood, 419 Camden Ave., Apt. D-2, Horseheads, N.Y. 14845

[21] Appl. No.: 553,906

[22] Filed: Nov. 6, 1995

[51] Int. Cl.$^6$ ........................................ B32B 35/00
[52] U.S. Cl. ........................................ 52/514; 52/100
[58] Field of Search ........................... 52/514, 98, 99, 52/100, 745.15, 514.5; 428/343; 33/563, DIG. 10

[56] References Cited

U.S. PATENT DOCUMENTS

| | | | |
|---|---|---|---|
| 4,425,391 | 1/1984 | Wilson | 428/343 X |
| 4,503,114 | 3/1985 | Cohen | 428/343 X |
| 4,776,906 | 10/1988 | Bernard | 52/514 X |
| 5,229,185 | 7/1993 | Shiota et al. | 428/343 X |
| 5,246,775 | 9/1993 | Loscuito | 428/343 |

Primary Examiner—Carl D. Friedman
Assistant Examiner—Timothy B. Kang
Attorney, Agent, or Firm—Salzman & Levy

[57] ABSTRACT

The present invention features a dispensing roll that has a string of tandemly-placed, tear-away, repair articles of manufacture. These repair articles each have an inner, mesh member that has a peripheral member consisting of finishing tape border that is fastened to and placed about the inner, mesh member. The repair articles are intended to be used to repair damaged drywall or plasterboard areas surrounding an electrical box, such as a receptacle box, a switch box or a junction box. A repair article is torn from the end of the dispensing roll along perforations that are provided between each article. Any cracks, holes, saw lines and blow-outs surrounding the electrical box are filled in with compound. The article is then placed over the hole in the drywall where an electrical box is located. The outer, tape border is sufficiently-sized to cover the damaged areas about the electrical box. The damaged areas are then finished off and coated with paint primer. A cover plate is then ready to be placed over the electrical box outlet.

12 Claims, 3 Drawing Sheets

REPAIR OF DRYWALL SURROUNDING ELECTRICAL BOXES

FIELD OF THE INVENTION

The invention pertains to the repair of drywall surrounding electrical boxes in newly-constructed or newly-renovated buildings and, more particularly, to an article of manufacture for use in repairing the damaged peripheral wall surrounding switch boxes, receptacle boxes and junction boxes that have been installed in newly-constructed or newly-renovated buildings and homes.

BACKGROUND OF THE INVENTION

In the construction of new buildings, workers are often careless in cutting holes in the drywall for electrical switch and receptacle boxes. These carelessly-cut holes often leave saw lines and cut-outs that extend beyond the perimeter of the cut-out configuration for the rectangular electrical box. Wall finishers usually fill in the lines and cut-outs around these electrical boxes by using a spackle or finishing compound, known in the trade as "mud". After they fill in, the finishers customarily use a single strip of finishing or drywall tape, pasting it over the damaged area. This results in an uneven bulge on the damaged side surrounding the electrical box. When a cover plate is installed over an electrical box, the plate usually protrudes about this high area, thus giving an unsightly, shoddily-built appearance to the electrical box.

The present inventor realizes that the finishers, painters and drywall workers do not have the time to handcraft each damaged wall about a receptacle or switch box so that the unsightly bulge(s) can be eliminated. This is, of course, unfortunate, because a potential buyer of the building is left with a negative impression, viz., that the workmanship rendered in the construction of the building is shoddy.

In order to resolve this and other, related problems, (such as preventing drywall compound from filling the receptacle and to patch holes left by removed receptacles), the inventor sought a means by which a repair could be quickly implemented, one which work crews and finishing personnel would not hesitate to use. This invention comprises a simple, but effective, way to fix drywall surrounding electrical boxes during building construction. A prerequisite for using his repair product is the need for rapid installation.

The invention comprises the use of a new article of manufacture, one that is easily and quickly deposited over the hastily-fabricated, electrical-box aperture in the drywall. This new article consists of a rectangular mesh that is the size of the electrical box, with a rectangular border of finishing tape that is integrally disposed about the periphery of the mesh. The article is applied over the electrical box after holes or saw lines have been compounded with spackle. Any excess compound is then wiped from the article, and the article then finish-coated. The peripheral finishing-tape border disposed about the mesh covers the entire perimeter of the electrical box. In this fashion, the cover plate will fit flush on all sides surrounding the electrical box. Thus, the article of invention provides a repair that exhibits a good appearance, in addition to furnishing convenient, efficient and rapid installation.

This inventive article of manufacture can be easily fabricated in a dispensing roll of perforated rectangles. Every time that he or she makes a repair, a worker can easily tear a rectangular piece of the mesh-and-tape combination from the roll. In this manner, the inventive article can be quickly and rapidly dispensed.

The inventive article can be produced in various sizes to accommodate two-, four- and six-receptacle boxes, and single or double electrical switch boxes.

This inventive article of manufacture can also be fabricated in a round shape, so as to accommodate telephone-jack boxes, 6" can lights, and 3" plaster rings.

It is an object of this invention to provide an article of manufacture for the repair of damaged drywall or plasterboard surrounding an electrical box.

It is another object of this invention to provide a means by which damaged drywall areas on the periphery of electrical outlet boxes can be quickly and aesthetically repaired.

It is yet another object of this invention to provide a repair article for drywall and plasterboard that can be rapidly installed by workers in the construction trades.

It is yet another object of this invention to prevent drywall compound from filling the receptacle or switch cutout, thus avoiding complications.

DISCUSSION OF RELATED ART

In U.S. Pat. No. 4,620,407 (entitled "Method for Drywall Patching", and issued to SCHMID on Nov. 4, 1986), a repair kit is illustrated for filling in holes in drywalls, sheetrock and gypsum. The kit consists of a template that has a saw guide for cutting out a portion of drywall about a damaged area. While this may be an effective means of making an intended repair, it is impractical because such a repair cannot be quickly accomplished. Any repair that requires making additional cuts in a wall will be eschewed by finishing workers.

In contrast to the aforementioned patented kit, the article of Applicant's invention can be quickly dispensed from a roll, applied over the electrical box and finished off.

In U.S. Pat. No. 4,989,385 (entitled "Device for Repairing a Hole in a Plasterboard Wall", and issued to MC CULLOUGH on Feb. 5, 1991), a repair article is illustrated that consists of a coverboard having an insulation board secured to its rear, adhesive surface. The insulation board is intended to fill the hole in the wall, and the coverboard is secured to the drywall by screws disposed at distal corners of the coverboard.

The repair kit of MC CULLOUGH cannot be used for electrical receptacles or switch boxes. However, even if it could be so adapted, the need for screw attachment makes it impractical as a kit for finishing work crews.

In U.S. Pat. No. 4,715,151 (entitled "Plasterboard Repair Kit", and issued to GARBLIK on Dec. 29, 1987), an inflatable member that fills a hole in the plasterboard is illustrated. This inflatable member is intended to be inserted inside the hole in the wall and, once deposited, to have same inflated. Thus, backing support is provided for the filling of the aperture with plaster or spackle.

This inflatable device cannot be used for the intended purposes of the present invention, viz., repairing holes, cracks and blow-outs around the drywall periphery of electrical boxes, such as receptacle boxes, switch boxes and junction boxes.

SUMMARY OF THE INVENTION

In accordance with the present invention, there is provided a dispensing roll comprising a string of tear-away repair articles of manufacture. This repair article comprises an inner, mesh member having a peripheral member consisting of a finishing-tape border that is integrally affixed to, and circumferentially disposed about, the inner mesh member. This repair article is intended to be used to repair damaged drywall or plasterboard area surrounding an electrical box, such as a receptacle box, a switch box or a junction box. A repair article is torn from the end of the dispensing roll along perforations provided between each article. Any cracks, holes, saw lines and blow-outs surrounding an electrical box are filled in with compound. The article is then placed over the hole in the drywall where an electrical box is located. The outer, tape border is sufficiently-sized to cover the damaged areas about the electrical box. The damaged areas are then finished off and coated with paint primer. A cover plate is then ready to be placed over the electrical box outlet.

BRIEF DESCRIPTION OF THE DRAWINGS

A complete understanding of the present invention may be obtained by reference to the accompanying drawings, when considered in conjunction with the subsequent detailed description, in which:

FIG. 7 depicts an in situ, front view of the article of this invention shown in FIG. 1, as applied about the electrical outlet box and drywall depicted in FIG. 1a.

DESCRIPTION OF THE PREFERRED EMBODIMENT

Generally speaking, the present invention features an article of manufacture for the repair of damaged drywall or plasterboard surrounding electrical boxes, such as receptacle boxes, switch boxes and junction boxes. It is a truism that both members of construction crews and electricians rapidly fabricate electrical outlets in the drywall of a building or dwelling under construction. In so doing, they often cause damage to the drywall about these electrical boxes. The current invention is designed to repair these damaged areas. The workers who finish off drywalls can rapidly and easily use this article to cover over the damaged areas in an aesthetically pleasing manner, with the rapidity that is required of product installation.

Figure 1:
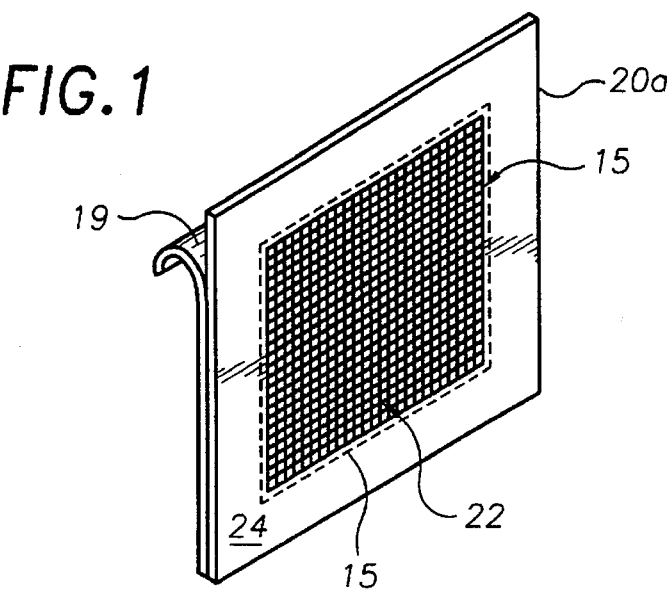
FIG. 1 depicts a perspective view of the article of this invention sized for a double-wide outlet box or switch.
Figure 1A:
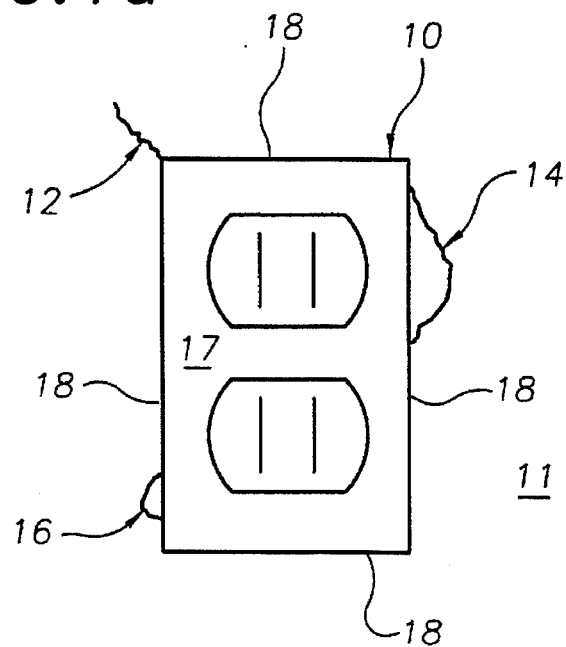
FIG. 1a illustrates a front view of a typically damaged drywall surrounding a standard, two-plug, electrical receptacle box.

Now referring to FIG. 1a, shown is a standard, electrical receptacle box 10 for receiving two electrical plugs within receptacle area 17. The receptacle box 10 is shown disposed in the drywall 11, having an area, defined by edges 18, surrounding the receptacle area 17 that is strewn with typically damaged places comprising an over-cut 12, a blow-out 14 and a hole 16.

Figure 2:
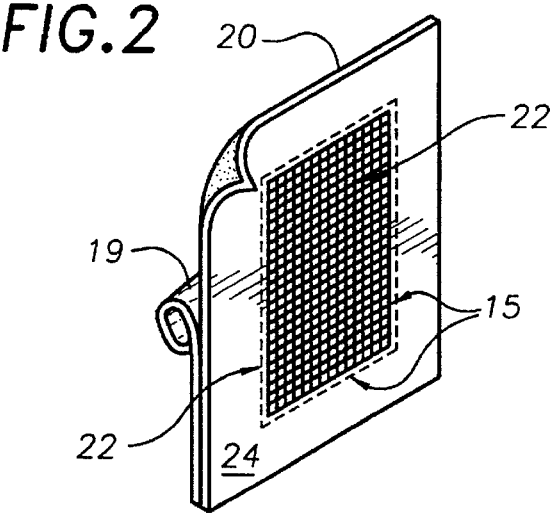
FIG. 2 shows a perspective view of the article of this invention sized for a standard-sized outlet box.
Figure 3:
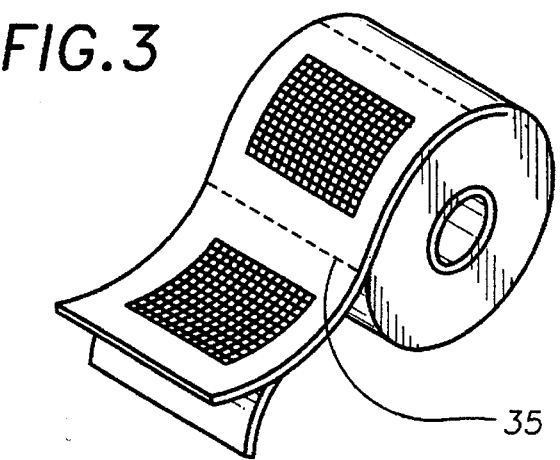
FIG. 3 illustrates a perspective view of a dispensing roll consisting of a string of tear-away articles of this invention, in accordance with FIGS. 1 and 2.
Figure 6:
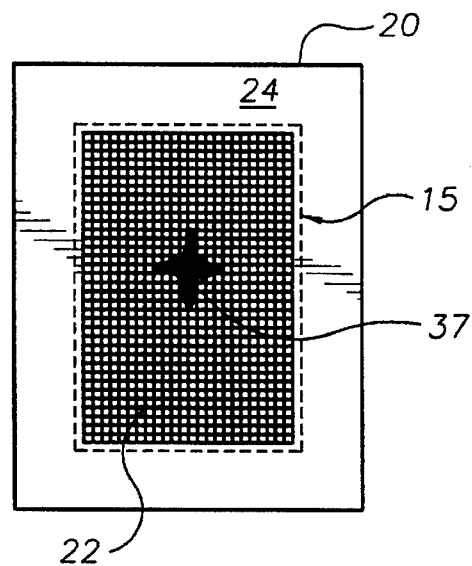
FIG. 6 illustrates a front view of the article of this invention shown in FIGS. 2 and 5.

Referring to FIGS. 2 and 6, a perspective and a front view of a repair article 20 of this invention are respectively shown. The repair article 20 is designed for use by wall-finishing workers in the repair of the typically damaged areas 12, 14 and 16, respectively, that are illustrated in FIG. 1a. The repair article 20 is designed to cover over the damaged areas 12, 14 and 16 in the drywall 11, as will be explained hereinafter with reference to the subsequent FIG. 7.

The article 20 comprises a rectangular, inner, mesh section 22 that has a rectangular, finishing-tape border 24. The inner mesh 22 is designed to be placed atop the receptacle portion 17 of the outlet box 10, with the peripheral tape border 24 covering the respective, damaged areas 12, 14 and 16, as depicted in FIG. 1a. A visual indicator 37 is printed on the inner mesh 22, disposed at the center thereof, to aid in positioning the article 20 over the receptacle 17 and to help locate the receptacle 17 at a later time. Ink or dye may be used for the purpose of printing the visual indicator 37.

Referring to FIG. 1, the inventive article is illustrated in a double-wide outlet size, and is given the designation 20a, in order to distinguish it from the standard-sized article 20, shown in FIG. 2.

Figure 4:
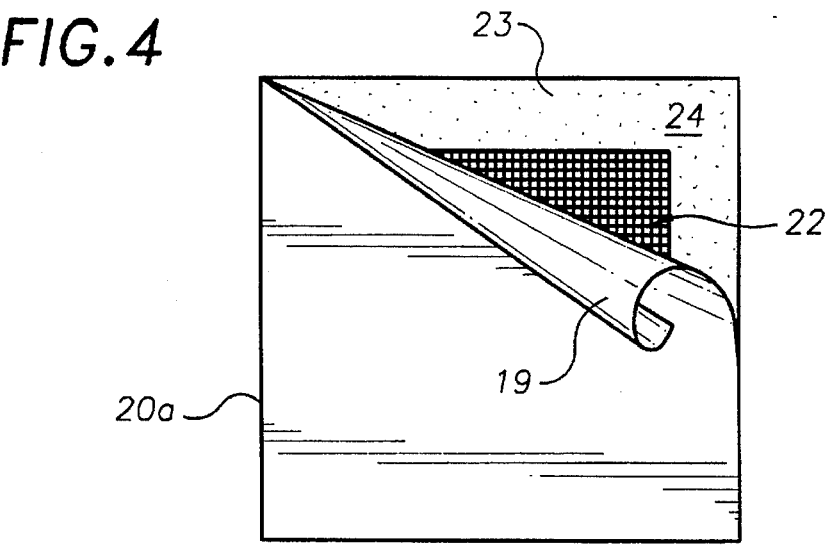
FIG. 4 depicts a back view of the article of this invention shown in FIG. 1.
Figure 5:
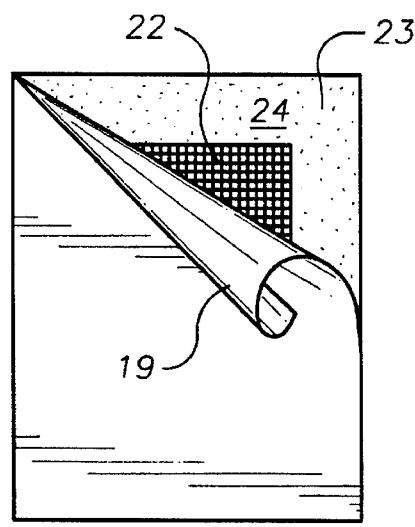
FIG. 5 shows a back view of the article of this invention shown in FIG. 2.

The articles 20 and 20a are each shown with a peel-off backing 19 and a 1/16" overlapping border 15 surrounding the inner, mesh section 22. The peel-off backing 19 is designed to uncover the adhesive surface 23, as shown in FIGS. 4 and 5, respectively.

Figure 7:
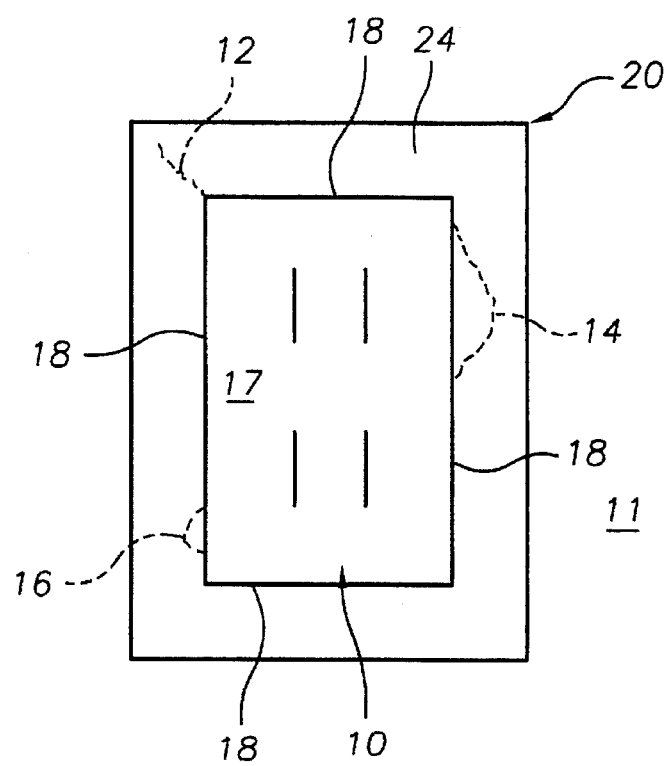

Referring to FIG. 7, the article 20 of this invention is shown adhered to the drywall 11, with the border tape 24 covering the damaged areas 12, 14 and 16, respectively, and the inner, mesh section 22 absent. When the backing 19 (not shown here) is removed from article 20, the article 20 is initially placed over the receptacle box 10, so that the mesh section 22 (not shown here) is disposed within the peripheral edges 18 defining the outlet area 17. The outer, tape border 24 covers the damaged areas 12, 14 and 16, respectively, as depicted in dotted lines. The tape border 24 is adhered to the drywall 11 via sticky backing 23, thus covering the damaged areas. The damaged areas, which are filled in with compound prior to applying article 20, may ooze excess compound material. This excess material is removed by a drywall knife (not shown), and the tape border then adhered to the drywall surface. The surface is then smoothed and finished off by the drywall knife. The area about the outlet box can then be primed to receive a coat of paint.

During installation, it is not necessary to remove the inner, mesh section 22; further, it can be used to provide added strength to the surrounding border 24. Mesh 22 is punched out or otherwise removed in order to install a receptacle or switch. However, if the mesh 22 is left in place, it can be used as a patch to fix holes left by a removed receptacle or switch cut-out. The mesh 22 must also be cut to accommodate the switch protuberance, when the article 20 is used for switch boxes.

It is also contemplated within the scope of the present disclosure that this type of article can also be used with other types of receptacle boxes, such as those used in fashioning telephone boxes. The article of this invention may be made in many different sizes, in order to accommodate differently-sized outlet boxes. The article may also be shaped to accommodate round boxes or any other shape common within a trade.

For purposes of claim definition, the terms "outlet area" and "electrical box" are intended to respectively define the "face" of any electrical, video or telephone receptacle or box or switch that may be placed within the wall of a building or dwelling, in accordance with standard or trade-defined construction practices.

For purposes of claim definition, the term "mesh" can comprise fabric mesh, wire mesh, plastic mesh, cellophane, clear solid plastic, paper mesh, solid transparentized (transparent and translucent) paper, etc.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An article of manufacture for use in repairing peripheral areas in a wall surface surrounding an electrical box having an outlet area that is adapted to receive an outlet plug, said article of manufacture comprising an inner, mesh section that is shaped and designed to cover a periphery of said outlet area of said electrical box, and an outer, tape border section that is integrally disposed about a periphery of said inner, mesh section for covering said wall surface surrounding said periphery of said outlet area of said electrical box, whereby damaged areas projecting from said periphery of said outlet area will be covered by said tape border section.

2. The article of manufacture for use in repairing peripheral areas in a wall surface surrounding an electrical box in accordance with claim 1, wherein said outer, tape border section has an adhesive surface on a back portion thereof for adherence to said wall surface.

3. The article of manufacture for use in repairing peripheral areas in a wall surface surrounding an electrical box in accordance with claim 2, further comprising a peel-off backing disposed upon said adhesive surface of said back portion of said outer, tape border section.

4. The article of manufacture for use in repairing peripheral areas in a wall surface surrounding an electrical box in accordance with claim 1, further comprising means defining a border disposed between said inner, mesh section and said outer, tape border section, whereby said inner, mesh section can be removed from said outer, tape border section.

5. An article of manufacture for use in preventing spackle or finishing compound from filling a switch cut-out or an electrical receptacle or box, said article of manufacture comprising an inner section that is shaped and designed to cover a periphery of said electrical box, and an outer, tape border section that is integrally disposed about a periphery of said inner section, and having an adhesive, back surface for covering and adhering to a wall surface surrounding said electrical receptacle or box, whereby spackle or finishing compound will be prevented from filling said electrical receptacle or box.

6. The article of manufacture in accordance with claim 5, further comprising a peel-off backing disposed upon said adhesive, back surface of said outer, tape border section.

7. The article of manufacture in accordance with claim 5, further comprising means defining a border disposed between said inner section and said outer, tape border section, whereby said inner section can be removed from said outer, tape border section.

8. An article of manufacture for use in repairing peripheral areas in a wall surface surrounding an electrical box having an outlet area, said article of manufacture comprising a dispensing roll of tear-away, repair articles, each of said tear-away, repair articles having an inner section that is shaped and designed to cover a periphery of said outlet area of said electrical box, and an outer, tape border section that is integrally disposed about a periphery of said inner section, and having an adhesive, back surface for covering and adhering to said wall surface surrounding said electrical box, whereby damaged areas projecting from said periphery of said outlet area will be covered by said tape border section.

9. The article of manufacture for use in repairing peripheral areas in a wall surface surrounding an electrical box in accordance with claim 8, further comprising a peel-off backing disposed upon said adhesive, back surface of said outer, tape border section.

10. The article of manufacture for use in repairing peripheral areas in a wall surface surrounding an electrical box in accordance with claim 8, further comprising means defining a border disposed between said inner section and said outer, tape border section, whereby said inner section can be removed from said outer, tape border section.

11. The article of manufacture for use in repairing peripheral areas in a wall surface surrounding an electrical box in accordance with claim 8, further comprising a visual indicator disposed substantially at the center of said inner section to aid in accurately placing said repair article over said electrical box, whereby the center of said electrical box may be subsequently identified.

12. The article of manufacture for use in repairing peripheral areas in a wall surface surrounding an electrical box in accordance with claim 8, wherein said dispensing roll is characterized by a string of said repair articles tandemly wound into a roll, and having means defining perforations therebetween, whereby each repair article can be removed from an adjacent repair article in said roll.

* * * * *